(12) United States Patent
Schneider et al.

(10) Patent No.: US 9,637,014 B2
(45) Date of Patent: May 2, 2017

(54) ALIGNMENT, VERIFICATION, AND OPTIMIZATION OF HIGH POWER WIRELESS CHARGING SYSTEMS

(75) Inventors: Jesse M. Schneider, Cranston, RI (US); Jonathan J. O'Hare, Warwick, RI (US)

(73) Assignee: WIRELESS EV Charge, LLC, Warwick, RI (US)

( * ) Notice: Subject to any disclaimer, the term of this patent is extended or adjusted under 35 U.S.C. 154(b) by 68 days.

(21) Appl. No.: 14/127,071

(22) PCT Filed: Jun. 28, 2012

(86) PCT No.: PCT/US2012/044517
§ 371 (c)(1),
(2), (4) Date: Mar. 21, 2014

(87) PCT Pub. No.: WO2013/003527
PCT Pub. Date: Jan. 3, 2013

(65) Prior Publication Data
US 2014/0217966 A1   Aug. 7, 2014

Related U.S. Application Data

(60) Provisional application No. 61/502,322, filed on Jun. 28, 2011, provisional application No. 61/595,155, filed on Feb. 6, 2012.

(51) Int. Cl.
| | |
|---|---|
| H02J 7/00 | (2006.01) |
| H01F 37/00 | (2006.01) |
| B60L 11/18 | (2006.01) |
| H02J 7/02 | (2016.01) |
| H02J 5/00 | (2016.01) |

(52) U.S. Cl.
CPC ......... *B60L 11/182* (2013.01); *B60L 11/1829* (2013.01); *H02J 7/025* (2013.01); *H02J 5/005* (2013.01); *Y02T 10/7005* (2013.01); *Y02T 10/7072* (2013.01); *Y02T 90/12* (2013.01); *Y02T 90/121* (2013.01); *Y02T 90/122* (2013.01); *Y02T 90/125* (2013.01); *Y02T 90/14* (2013.01)

(58) Field of Classification Search
CPC   B60L 11/182; B60L 11/1838; B60L 11/1818; B60L 11/1846; B60L 11/1862; H04B 5/0037; H02J 7/025
USPC ................................ 320/109, 108; 307/104
See application file for complete search history.

(56) References Cited

U.S. PATENT DOCUMENTS

| | | | |
|---|---|---|---|
| 5,461,298 A * | 10/1995 | Lara ...................... | B60L 3/0046 320/109 |
| 5,617,003 A | 4/1997 | Odachi | |
| 6,260,649 B1 * | 7/2001 | Carney, Jr. ................ | B60L 7/12 180/220 |

(Continued)

*Primary Examiner* — M'Baye Diao
(74) *Attorney, Agent, or Firm* — Chace Ruttenberg & Freedman LLP

(57) ABSTRACT

Provided are a method and apparatus and method for the alignment, verification and optimization of wireless charging systems manufactured for use and used with electric vehicles. With some minimal modifications the same apparatus may be used to align a charging coil mounted on a vehicle with a charging coil, mounted on or in an electric vehicle charging bay or parking space, or to verify and optimize manufactured wireless vehicle charging system elements before they are installed.

15 Claims, 5 Drawing Sheets

(56) References Cited

U.S. PATENT DOCUMENTS

| | | | |
|---|---|---|---|
| 7,023,177 B1* | 4/2006 | Bussinger | B60L 11/1816 320/109 |
| 7,568,538 B2* | 8/2009 | Drosendahl | B62K 9/00 180/65.1 |
| 8,384,344 B1* | 2/2013 | Rogers | H02J 7/00 180/65.21 |
| 8,482,250 B2* | 7/2013 | Soar | H01F 38/14 320/104 |
| 8,890,472 B2* | 11/2014 | Mashinsky | B60L 11/182 307/104 |
| 2001/0002786 A1 | 6/2001 | Najima | |
| 2010/0235006 A1 | 9/2010 | Brown | |
| 2011/0089894 A1 | 4/2011 | Soar | |
| 2011/0204845 A1* | 8/2011 | Paparo | H01F 38/14 320/108 |
| 2011/0221387 A1* | 9/2011 | Steigerwald | B60L 11/182 320/108 |
| 2012/0032632 A1* | 2/2012 | Soar | H01F 38/14 320/108 |
| 2013/0238145 A1* | 9/2013 | Hammer | G01F 23/0023 700/279 |
| 2014/0111152 A1* | 4/2014 | Kai | B60L 11/182 320/108 |
| 2014/0232336 A1* | 8/2014 | Kepka | B60L 11/182 320/108 |

* cited by examiner

ALIGNMENT, VERIFICATION, AND OPTIMIZATION OF HIGH POWER WIRELESS CHARGING SYSTEMS

CROSS REFERENCE TO RELATED APPLICATIONS

This application is a 371 of PCT/US12/044517 filed Jun. 28, 2012 which claims benefit of provisional application 61/502,322 filed Jun. 28, 2011 and provisional application 61/595,155 filed Feb. 6, 2012.

FIELD OF THE INVENTION

The invention concerns high power wireless charging systems, particularly the wireless charging of electric vehicles. More specifically the invention provides an apparatus and method for the alignment, verification and optimization of wireless charging systems manufactured for use and used with electric vehicles.

BACKGROUND

Fully electric and hybrid (for example, gas and electric and fuel-cell and electric) vehicles in existence today typically require charging via plug-in cables that are manufactured in accordance with international standards. (The term "electric vehicle" as used here is intended to encompass both fully electric and hybrid vehicles.) This conductive connection requires the vehicle operator to plug a charging cable into the vehicle. The cable must remain connected to the vehicle during the charging process. One disadvantage of this approach is that it requires the use of high voltage cables. Frayed or damaged cables create a hazardous condition and can cause an electric shock. Because the cable is repeatedly inserted and removed from a receptacle, cycle life is an issue. Maintenance of public charging stations is another concern, especially in winter climates where reliability and accessibility could become issues in icy and snowy weather. The cables must be manufactured to be able to withstand any kind of environmental condition. A plug-in system is also inconvenient as the vehicle operator must plug and unplug the charging unit from the vehicle.

Wireless charging systems have been proposed in response to the aforementioned disadvantages and inconveniences. Two kinds of wireless charging are being investigated: inductive charging and magnetic resonance power generation. Inductive charging uses an alternating electromagnetic field generated by the charging coils to send and receive energy. A magnetic coil in a charging base station creates an alternating electromagnetic field and a second induction coil in a portable device having a battery receives power from the electromagnetic field and converts it into electrical current to charge the battery. Inductive charging carries a much lower risk of shock because there are no cables or exposed conductors. The ability to fully enclose the charging connection makes inductive charging attractive where water impermeability is required. For example, low power (i.e., 3 kilowatts or less) inductive charging is used for implanted medical devices and for electric hygiene devices, such as toothbrushes and shavers that are frequently used near water. Inductive charging makes charging electric vehicles more convenient because it eliminates having to connect a power cable. Some disadvantages of inductive charging are its lower efficiency and increased resistive heating in comparison to plug-in systems. Implementations using lower frequencies or older drive technologies charge more slowly and generate heat within most portable electronics. Inductive charging also requires drive electronics and coils, increasing the complexity and cost of manufacturing.

Because there can only be a small gap between the two coils, inductive charging is considered a short-distance wireless charging system. Newer approaches to inductive charging reduce transfer losses by using ultra thin coils, higher frequencies, and optimized drive electronics. These newer technologies provide charging times comparable to wired approaches and have been employed in vehicle charging. Large and small paddle inductive charging systems (Called Magne Charge LPI and SPI respectively) have been used in conjunction with battery powered electric vehicles (BEV) formerly made by General Motors. However, General Motors withdrew support for the system after the California Air Resources Board settled on a different conductive charging interface for electric vehicles in California. The Magne Charge system (also known as J1773) used high-frequency induction to deliver high power (more than 10 kW) at an efficiency of 86% (6.6 kW power delivery from a 7.68 kW power draw). Other inductive charging systems have been proposed that eliminate cables entirely. For example, U.S. Pat. No. 5,703,461 (Monoshima et al.) discloses an inductive charging system in which the secondary, or receiver, coil is mounted at a specified location under the rear of the vehicle and the primary, or transmission, coil is located above ground on an arm that is able to align the coils without interference.

Non-resonant coupled inductive charging systems work on the principle of a primary coil generating a magnetic field and secondary coil subtending as much as possible of that field so that the power passing though the secondary coil is as close as possible to that of the primary. The requirement that the magnetic field generated by the primary coil be covered by the secondary coil results in a very short range. Over greater ranges, the non-resonant induction method is highly inefficient as the majority of the energy is in resistive losses of the primary coil.

Using magnetic resonance power generation helps increase efficiency dramatically. If resonant coupling is used, each coil is capacitively loaded so as to form a tuned LC (the L stands for inductor and the C stands for capacitor) circuit. If the primary and secondary coils are resonant at a common frequency, significant power may be transmitted between the coils at reasonable efficiency over a range of a few times the coil diameters. The general principle is that if a given oscillating amount of energy is placed into a primary coil that is capacitively loaded, the coil will 'ring', and form an oscillating magnetic field. The energy will transfer back and forth between the magnetic field in the inductor and the electric field across the capacitor at the resonant frequency. This oscillation will die away at a rate determined by the Q Factor, mainly due to resistive and radiative losses. However, provided, the secondary coil absorbs more energy than is lost in each cycle of the primary, then most of the energy can still be transferred. The primary coil forms a series RCL circuit (the R stands for resistor), and the Q factor for such a coil is:

$$Q = \frac{1}{R}\sqrt{\frac{L}{C}}.$$

So, if R=10 ohm, C=1 micro farad, and L=10 mH, the Q Factor is 1000. Because the Q factor can be very high, (experimentally around 1000 has been demonstrated with air cored coils, see Kurs, et al., *Wireless Power Transfer via Strongly Coupled Magnetic Resonances, Science* 317: 83-86 (2007) and United States Patent Publication No. 2010/010909445 entitled *Wireless Energy Transfer Systems*) only a small percentage of the field has to be coupled from one coil to the other to achieve high efficiency and the primary and secondary can be several diameters apart. Because the Q can be very high even when low power is fed into the transmitter coil, a relatively intense field can build up over multiple cycles, which increases the power that can be received. At resonance, far more power is in the oscillating field than is being fed into the coil, and the receiver coil receives a percentage of that power. The voltage gain of resonantly coupled coils is proportional to the square root of the ratio of secondary and primary inductances. See also, *Wireless Power Minimized Interconnection Problems, Power Electronics Technology:* 10-14 (July 2011).

In either case, inductive or magnetic resonance power generation, the alignment of the coils is thought to be critical. (But see, Villa, et al., *High-Misalignment Tolerant Compensation Topology for ICPT Systems, IEEE Transactions on Industrial Electronics* 59: 945-51 (February 2012)) Certain self-aligning methods for inductive power chargers are disclosed in U.S. Pat. No. 5,646,500 (Wilson) and U.S. Pat. No. 5,498,948 (Bruni and Davenport), both of which are assigned to Delco Electronics. The '500 patent discloses a light-activated mechanical positioning system for aligning the primary (i.e., transmission) and secondary (i.e., receiver) coils. A light source is disposed on the electric vehicle and an array of photoelectric detectors is disposed adjacent the charging coil. The detector array is coupled with a servo control system that includes an X-Y-Z mechanical driver that moves the position of the charging coil in the X, Y, or Z direction based upon signals provided by the array. The '948 patent discloses a slidable alignment mechanism composed of a series of coupled, vertical, horizontal and lateral slide mechanisms that are coupled to the primary coil and to a series of aligning plates disposed at predetermined locations around the coil. Rollers disposed adjacent the secondary coil on the vehicle cause the aligning plates to move if the primary (charging) and secondary coils are misaligned. Similarly, United States Patent Publication 2001/0221387 discloses an inductive energy transfer system in which the charging coil is coupled with a plurality of step-up motors and lead screws that mechanically drive the coil in the x, y, and z-dimensions until the charging coil and the secondary coil are properly aligned. A sensor adjacent the charging coil detects the strength of the magnetic field emanating from the secondary coil and aligns the primary coil in the x, y, and z-directions to produce maximum power. Each of these systems attempt to address the proper engagement of primary and secondary coils that are already in close proximity to each other—they are above ground, located near the front of the vehicle, and use some kind of armature to move into a receptacle to create an inductive coupling.

The challenge in implementing any of these technologies as a practical wireless charging solution requires that the primary and secondary charging coils are aligned well enough for acceptable efficiency as compared with a plug-in charging system. Alignment of the coils is further complicated by the fact that no standard exists among manufacturers relating to the position of the secondary coil on the vehicle and no methodology appears to exist to verify and optimize performance, safety and communication systems used in wireless electric vehicle charging systems. The variety of inductive and magnetic resonance methods have been proposed for wireless charging, they all have varying interoperability, performance (such as efficiency of charging), communications, and safety parameters. It would be advantageous to have a charging system that would work with most any vehicle regardless of the mounting location of the secondary coil. What is required is an apparatus for properly aligning the charge coils of electric vehicle in a charging station regardless of the location of the secondary coil. It would be highly advantageous if that apparatus could also be employed to test the charging system and validate and optimize the parts of the system before and after installation.

INVENTION SUMMARY

Herein is described a method and apparatus for properly aligning an electric vehicle in a charging station and for validating and optimizing an electric vehicle charging system before it is used to charge an electric vehicle, for example after manufacture and before installation. Unlike apparatuses and systems already known of which we are aware, the gap in the z, or vertical direction in this method and apparatus need not be small. We assume a greater vertical air gap is possible with new magnetic resonance technology for example, and have designed a system specifically for use with that technology. Witricity™ makes such core technology. Intel also describes use of resonant induction technology and calls it "Wireless Energy Resonant Link" (WREL). See also, Oak Ridge National Laboratory publication ORNL 2001-G00235/jcn, which can be found at http://www.ornl.gov/adm/partnerships/
factsheets1100236_ID2250_2637_2638_2639_2667.pdf.
The current state of the technology and the players in the field are reviewed at: //thefutureofthings.com/news/5763/intel-s-wireless-power-technology-demonstrated.html. We also assume that the secondary charge coil on the vehicle is arbitrarily fixed anywhere along the length of the vehicle frame but close to the vehicle's centerline and that the primary coil is located either above, even with, or below ground level of a parking space. When used for alignment, the apparatus can be contained within a tunnel-like enclosure providing a track by which the primary coil can be transported along the vehicle centerline, and its proper alignment can be determined, through a feedback control loop.

As will be described below, the apparatus may be readily adapted to provide an apparatus for aligning a primary circular coil with a secondary circular coil in an electric vehicle charging system, because the same principles are involved in verification and optimization as are in alignment, but the aspects of the invention involved in alignment are not as complex. The system may be an inductive electric vehicle charging system or a magnetic resonance electric vehicle charging system as described above.

Accordingly, and in one aspect, the invention is apparatus for alignment, and/or verification and optimization of the charging coils in an electric vehicle charging system. The apparatus includes two circular charging coil units, a first and a second, disposed in spaced-apart relation to each other. One of the charging coil units is coupled by means of an electric circuit to an electrical energy source and each of the charging coil units are composed of a housing and a flat, circular, charging coil disposed within the housing in such manner that the coils are superposable on each other along their y-axes when the units are in alignment in order to create a magnetic field. The apparatus further includes a guideway sub-assembly that includes a drive mechanism configured to translate the first charging coil unit in the x-, y-, and z-directions, or a subset of these directions, to align the coils along their x- and/or y-axes, and at various gap distances in the z-axis, in superposed relation to each other, and a sensor sub-assembly for locating the position of the coil units relative to each other and for detecting any disruption or deteriorization in the field strength created by the aligned coils. The data from the sensors is transmitted to a system controller that allows a user of the apparatus, via a feed-back loop, to control the power to the system and to operate the drive mechanism for moving the second charging unit to align the coils properly for maximum field strength, to verify that the coils are installed properly, or to verify that they have been manufactured according to specification.

The guideway sub-assembly includes a pair of x-axis linear guideways positioned in parallel, spaced-apart, relation to each other, a y-axis linear guideway positioned above and between the pair of x-axis guideways in perpendicular relation thereto and formed to rest on the stationary supporting columns at each of the ends of the x-axis guideways, and a linear carriage slidably mounted on the y-axis linear guideway. The linear carriage has a second bearing guideway incorporated within its structure to provide motion in the z-axis by means of a z-rail, which supports the coil unit, by a pivot joint. The pivot joint mounted on the end of the z-rail permits three degrees of rotational freedom of movement by means of three actuators mounted in three independent locations connected between the end of the z-rail and the first charging coil unit. The linear carriage is slidably mounted on the y-axis guideway by means of a first set of bearings incorporated into the underside of the carriage and formed to rest on the y-axis guideway. So that the x-axis guideways do not move about, they are connected to each other and maintained in parallel orientation by means of at least one rigid connection beam extending between and disposed in perpendicular relation to the two x-axis guideways. In one embodiment in which the apparatus finds use as an alignment tool as will be described below, each end of the y-axis linear guideway is formed to terminate in a reversible, 'C' shaped collar so that the y-axis linear guideway may rest either on top or below the pair of x-axis linear guideways. In this case a second set of bearings are mounted interiorly in the 'C' shaped collar to permit an unimpeded sliding motion of the y-axis linear guideway along the pair of x-axis guideways. This kind of configuration is known as a stationary bridge design, i.e., two columns supporting a guideway axis like a 'C' or 'U' shape, where the x-axis is able to move through it.

The sensor sub-assembly includes electromagnetic field signal means and a drive mechanism composed of translational drive means and rotational drive means. In one embodiment, the electromagnetic field signal means of the sensor sub-assembly is composed of an RFID reader centrally positioned on the first coil unit, and three RFID tags positioned in a triangular arrangement on the second coil unit. This enables location of the coil units relative to each other and transmission of the location to the system controller. In a second, alternative, embodiment, the electromagnetic field signal means of the sensor sub-assembly is composed of an EMF probe centrally positioned on the first coil unit in alignment with the y-axis of the first coil and a single RFID tag centrally positioned on the second coil unit in alignment with the y-axis of the second coil for determining the absolute distance error between the coil units and transmitting that error to the system controller. In this alternative embodiment, the position of the coils relative to one another may not be known, however the magnitude of error can be determined and used for proximity sensing. The translational drive means is actuated by servo drives connected to an electrical power source so that the first charging coil unit may be moved in the x-, y-, and z-directions relative to the second charging coil unit. The rotational drive means is actuated by a motor means so that the first charging coil unit may be moved in an angular orientation about the x-, y-, and z-axes of the second charging coil unit. The motor means may include a linear motor connected to an electric power source. Alternatively, the motor means may include a pneumatic piston connected to an air supply. In each of these embodiments, the choice of motors, servo drives, electric power sources, pneumatic pistons and air supplies are within the level of skill in the art, as is how they each operate. The apparatus of the invention further includes a system controller connected to an electrical power source and via a circuit to the translation and the rotational drives means of the drive mechanism. The system controller is configured to manage, control and direct the movements of the first and second charging coil units and to shut-down the assembly in case a disruption in field strength, due to the presence of an object for example, is detected. The system controller is also configured to initiate a charging cycle and to shut-off charging upon the detection of a disruption in field strength. An automatic shut off/power transfer detection sensor and breaker switch, which is controlled by the system controller, is provided for this purpose. The types of RFID readers, tags, and EMF probes usable in the apparatus and method of the invention and how they operate is also well known in the art.

When used as an optimization and verification tool, the second charging coil unit is positioned on a slab or within a foundation simulating a roadway supporting infrastructure and the y-axis linear guideway is positioned on the pair of x-axis guideways so that it rests above the pair. When used as an alignment tool the second charging coil unit is positioned on the undercarriage of the vehicle and the y-axis linear guideway is positioned on the pair of x-axis guideways so that it rests below the pair in a manner described in detail below.

In another aspect, the invention is an improved method for aligning or verifying and optimizing the charging coils in an electric vehicle charging system. The improved method comprises detecting the location of the first charging coil relative to the second charging coil in the system by electromagnetic field sensors means mounted on the first and second charging coil units and a system controller electrically coupled to the electromagnetic field signal means. The electromagnetic field sensor means comprises an RFID reader centrally positioned on the primary coil unit along the y-axis of the coil in that unit and three RFID tags positioned in a triangular arrangement on the secondary coil unit. Using known triangulation methodologies and systems the reader and tags locate the charging coil units relative to each other and transmit the location to the system controller. Alternatively the electromagnetic field sensor means comprises an EMF probe and a single RFID tag positioned in identical central positions aligned with the y-axes of the first and second coil units. The probe and tag arrangement likewise locates the charging coil units relative to each other but transmits the strength of the signal to the system controller. In both instances, the system controller, which is connected via a circuit to a power source and to the translational and rotational drive means of the assembly to align the first and second circular charging coils along their y-axes to maximize the field strength of the coils. In the probe and tag arrangement the system uses the strength of the single to hone, or focus, in on the alignment to attain a maximum signal strength.

The invention is intended to address the problems with electric vehicle charging stations and anticipates that the parts of such systems will have to be verified and optimized before and after installation. Because no standard exists among manufacturers for the position of the secondary coil on the vehicle, the charging apparatus must be designed to be make and model independent. The use of a circular secondary coil on the bottom of the vehicle makes it accessible to a charging system regardless of vehicle size or how it is parked into position. In some known, above-ground, charging stations installed at the front of a parking space, a hard stop at the front wheels is required so that the vehicle does not collide with the charging unit. Since not all vehicles have the same distance from the front wheels to the bumper, generalizing such a design would appear to be impractical. In addition, any armature system would appear to require a high level of complexity and concomitant expense, since a movable armature would need to be actuated in multiple directions and extended outward against, the force of gravity as a cantilever. One object of the invention is to provide an alignment, apparatus that eliminates these problems.

Another object of the invention is to preserve the form of the parking spaces so that minimal changes to the existing parking infrastructure are necessary and that special maintenance of the infrastructure is riot required. A below ground or ground-level system allows for pull-though parking spaces in large open parking lots. Below ground systems also cannot be knocked into or damaged by vehicles, and they allow for easy outdoor maintenance such as snow removal.

Another object of the invention is to make the parking procedure seamless and easy for the vehicle operator and as close to parking a traditional internal combustion vehicle as possible.

Another object of the invention is to provide an apparatus for simulating various alignment scenarios in order to measure the wireless vehicle's charging systems performance and safety so that the system can be optimized and have its final performance verified, in situ or ex situ.

These and other objects and advantages of the invention are further explained in conjunction with the detailed description, drawings, and claims that follow.

DETAILED DESCRIPTION

The invention is composed of a coordinate positioning and measuring frame that is computer programmable for the purpose of automatically running test procedures for the optimization and verification of high power wireless charging devices. By high power, we mean greater than 3 kilowatts. The frame employs the basic ideas behind a CNC multi-axis machine tool and coordinate measuring machine that are commonly used in manufacturing. It employs servo drives and/or other actuators for positioning and encoders and scales for precisely measuring position but has been adapted to position and record location and orientation information of a charge coupler device's magnetic resonance coils. To this end, the frame of the apparatus, as will be described in detail infra, must be ridged enough to support the weight of the magnetic resonance coils in their assembled modules as they are manufactured (hereinafter referred to as charging coil units) and have powerful enough drives to move and position the modules. Exemplary materials useful for this purpose include aluminum, steel, concrete, and polymer concrete.

Figure 1:
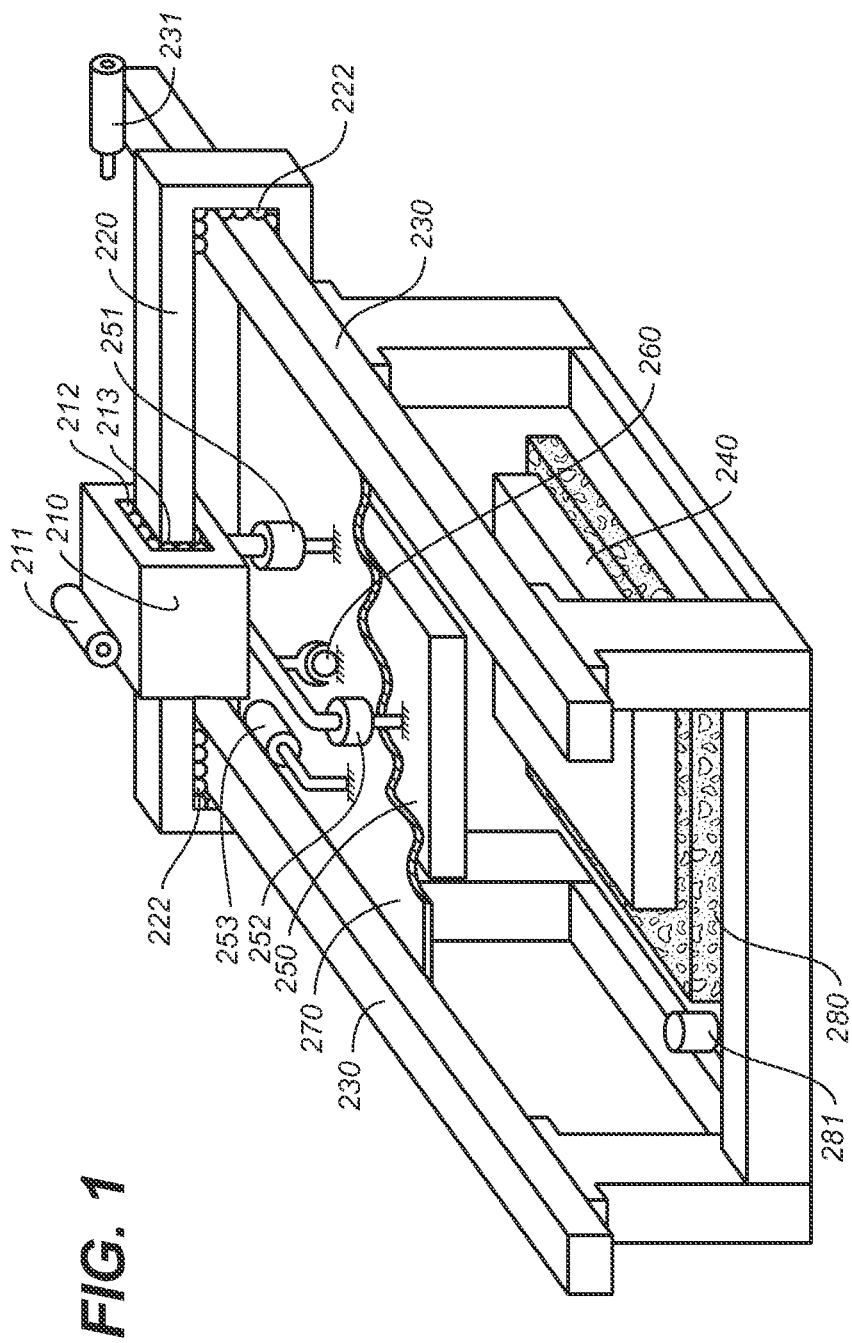
FIG. 1 is a perspective view of the mechanical sub-assembly of the testing apparatus of the invention in detail depicting the major mechanical features of the invention.
Figure 2:
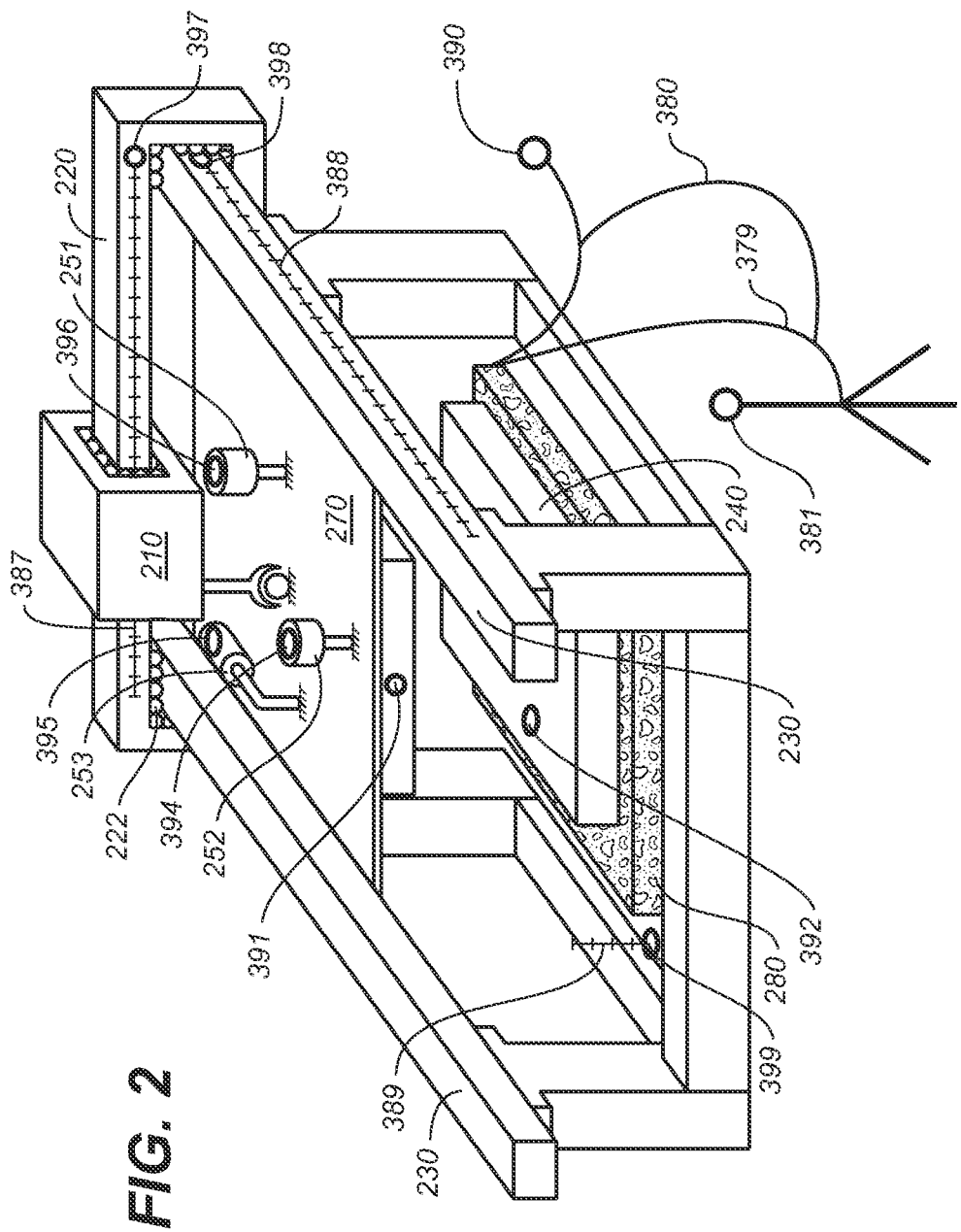
FIG. 2 is a perspective view of the sensor sub-assembly of the testing apparatus of the invention in detail depicting the location if the sensors on the mechanical sub-assembly.
Figure 3:
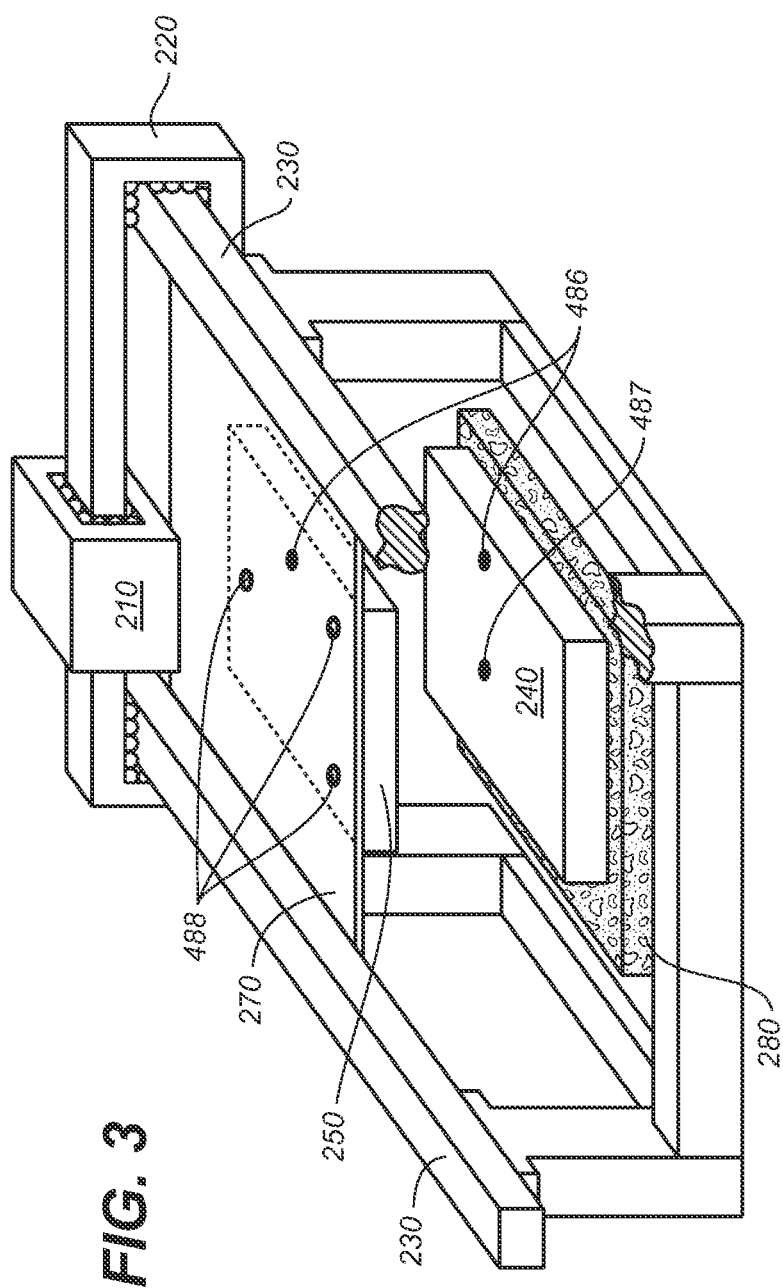
FIG. 3 is a perspective view of the communication sub-assembly of the testing apparatus of the invention depicting the placement of communication sensors on the mechanical sub-assembly.
Figure 6:
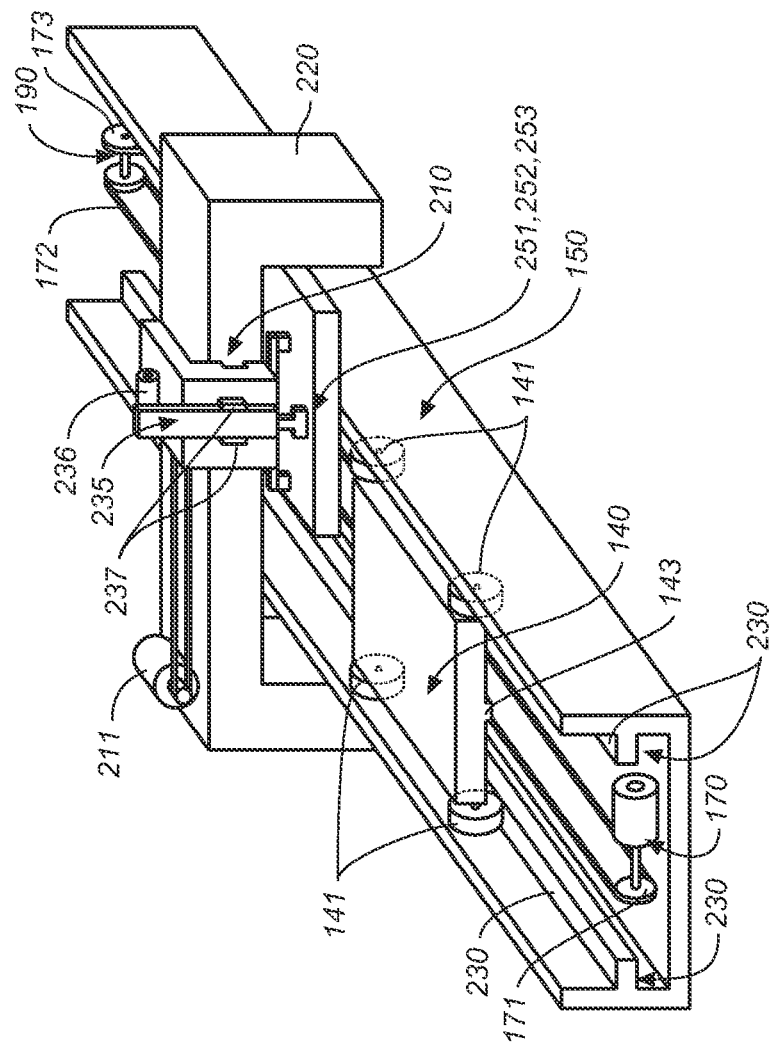
FIG. 6 is a perspective view of an additional embodiment of the apparatus of the invention when used as a verification and optimization tool.

Referring now to FIGS. 1-3, which illustrate the apparatus of the invention in detail as a verification and optimization tool, in FIG. 1 there is illustrated a mechanical sub-assembly that shows the major mechanical features of the invention. In FIG. 1, there is shown a Y-axis carriage, 210, and a servo drive, 211, in functional communication with the Y-axis carriage 210 in the same manner as would be employed in a CNC machine tool, for example. Y-axis carriage provides motion along the y-direction of the apparatus. Carriage 210 is mounted on Y-axis guideway 220 and has bearings positioned in the side of the carriage that will rest on the Y-axis guideway to enable easy reciprocation of the carriage in the Y-direction along the guideway. As shown it is formed with a hollow central core or bore, 213 and inside central core 213 are mounted bearings 212. Y-axis carriage 210 is positioned such that its central core surrounds a Y-axis guideway, 220, so that guideway 220 extends there through. Y-axis carriage 210 is thereby able to reciprocate along guideway 220 in response to a signal from servo drive 211 by means of bearings 212 that are mounted in the inside core of carriage 210 in contact with the guideway for moving y-axis carriage along the length of guideway 220. While shown as a hollow structure, one of skill in the art would be able to configure other alternative structures for the y-axis carriage that would work in the same manner. For example, the carriage could be composed of a frame like structure supporting the necessary bearings to provide straight motion in the Y-axis with minimal friction. The actual shape of the carriage is not critical, as long as it is able to move along the Y-axis guideway in the Y-direction. Guideway 220 may terminate at each end in an upside down 'L' or sideways 'C' (as shown), such that it is mountable in a similar reciprocating manner on a pair X-axis guideways, 230, disposed in parallel relation to each other. To enable the Y-axis guideway 220 to freely slide forward and backward along parallel X-axis guideways 230, bearings 222 are mounted in the bottom of terminal ends of the guideway or in the interior portions of each of the 'L' shaped (see FIG. 6) or 'C' shaped (see FIG. 1) ends of the guideway, thus functioning as a carriage that is able to ride on the X-axis guideways. The mounting of such bearings and the formation of the guideways and carriage are well within the level of skill in the art. Also within the level of skill in the art is an optional construction of the Y-axis carriage such that it provides a guideway for a Z-axis to enable movement in the vertical direction. This is illustrated in FIG. 6 where Z-axis rail 235, guideways 237, and servo drive and pulley system 236 are shown.

A flat panel, 270, is provided, to which is removably mounted on one surface of a second charging coil unit, 250. (A first charging coil unit is either on the ground or below the second charging coil unit. The first charging coil unit delivers the power to the second charging coil unit.) Because the flat panel is intended to simulate a vehicle chassis (to reproduce the same electromagnetic obstacle imposed by a vehicle) it is preferably made of sheet metal. The opposite surface of flat panel 270 is connected to carriage 210 by pivot joint 260, thereby allowing the second charging coil unit mounted thereon three degrees of freedom in rotation. (Although one pivot joint is shown, more than one may be used.) Actuators 251, 252, and 253, are mounted between carriage 210 and panel 270 and formed to provide rotational movement and positioning about X-, Y-, and Z-axes to orient the second charging coil unit 250 together with flat panel 270 to precise angles relative to a second charging coil unit, which is either stationary in the base of the apparatus or movable in the X-direction. It is understood that either the first or second charging coil units may be effectively actuated to achieve the same relative orientation between coils for testing purposes, however, only one coil is required to move. In this manner the one of the charging coil units is suspended in free space above the other coil unit. Allowing for this free space between and around the charging coils is an important aspect of the design because it prevents the charging coils from being influenced electromagnetically by the apparatus during testing.

Still referring to FIG. 1, disposed between x-axis guideways 230 is the first charging coil unit, 240. The first charging coil unit 240 is composed of a circular coil coupled to an electric energy source and commonly referred to as the "primary coil" by those skilled in the art. Likewise, the second charging coil unit, 250, is composed of a circular coil which is coupled to an electric load (a vehicle propulsion battery for example) and commonly referred to as the "secondary coil" those skilled in the art. Both the primary and secondary coils are enclosed in suitable housings (for example, made of plastic or a composite material impermeable to the weather and which does not interfere with the electromagnetic power transmission) for each is known in the art and need not be described here. As shown, first charging coil unit 240 is positioned on a concrete slab, 280, to simulate the primary coil supporting infrastructure in which the charging device eventually will be used. Motion in the Z-direction (i.e., vertically) is achieved by the movement of the Z-axis within the Y-carriage guideway. (see FIG. 6) Alternatively, the first charging coil unit may be move in the Z-direction by a mechanism on which it rests. It may be pointed out that the purpose of actuating the base for motion in the Z-axis direction instead of actuating the Z-axis rail from above is that the z-axis requires the smallest range of motion of any axis, and therefore may be most easily separated from the other mechanics of the assembly. Base 280 may move in the Z-direction by means of lead screw mechanism, for example, if desired and incorporation of these structures is well within the level of skill in the art. Base 280 contains rebar and is made to resemble that of the vehicle road infrastructure to simulate as closely as possible the actual charging environment of the vehicle. Similar to the purpose of flat panel 270, a concrete or asphalt slab, as is simulated by base 280, may also have some influence on the charging coils that is significant enough to reproduce during testing, optimization and verification.

Referring now to FIGS. 2 and 3, there is shown the sensor subassembly of the apparatus of the invention. In FIG. 2, the sensor sub-assembly is shown including linear scales, 387, 388, and 389, that are readable by linear encoders, 397, 398, and 399, for each of the three axes, where 397 is for measuring position in the Y-axis, 398 is measuring position in the X-axis, and 399 is for measuring position in the Z-axis. Each of the three linear scales is fixed to the guideway of each axis, and the linear encoders are fixed to the carriages to read the movements along their respective scales. (For simplicity's sake, the Z-axis guideway has been omitted from FIG. 2, but the Z-axis linear scale, 389, and linear encoder, 399, are shown near the base.) The linear encoders are connected to the controller where the signals are decoded to determine the actual position of the coils relative to each other during the test procedure of the manufacturer's charge coil system. Additionally, there are three rotary encoders for each of the three angular orientations of the coil unit, about the X-, Y-, and Z-axes. These angular encoders, 394, 395, 396, are mounted at each of the rotational actuators between the Z-rail and coil unit and connected by the pivot joint about which the coil unit rotates. The rotary encoders are connected to the controller where the signals are read and decoded in order to determine the actual angular orientation of the coil unit during the test procedure of the manufacturer's charge coil system. Thermistors or thermocouples, 391 and 392, mounted each on the first and second charging coil units are connected to the system controller for reading the temperature of the coil units during the alignment and/or optimization and verification test procedures. The sensor sub-assembly also includes an automatic shut off, an electromagnetic field (EMF) sensor (unnumbered) centrally mounted on the first charging coil unit whose signal is interpreted by the system controller. If the EMF sensor senses a disruption or deterioration in the field strength created by the aligned coils, the system controller will power off the system. The connections between the main power source, step down transformer, and system controller need not be described in detail, being a standard feature and known in the art. Also included in this sub-assembly is an electromagnetic field (EMF) sensor, 381, mounted on a tripod (unnumbered) that is positioned near the apparatus to measure the strength of the electromagnetic field. This sensor, 381, is electrically connected to the apparatus of the invention by means of an electric cable, 379. The tripod bearing the EMF sensor 389 may include a range measurement sensor to record distance from the coils while measuring electromagnetic field strength. The range measurement sensor may be a simple stretch cord or tape measure encoder, or standard carpentry grade laser distance measurement sensor for recording distance with a resolution in inches or centimeters. Both the EMF strength and distance measurement sensors are connected to the controller for recording the field strength at specific distances away from the charge apparatus during the alignment optimization test procedure. The purpose of this measurement is to ensure that electromagnetic field strength is kept to the minimum required regulatory limits during the charge cycle. Sensor 390 is a movable ambient temperature sensor that records temperature during the testing procedure. It may be positioned near the apparatus and connected to it by means of electric cable 380, to measure the ambient temperature of the installation. Sensors 391 and 392 are temperature sensors mounted on the first and second charging coil units, 240 and 250 respectively, for measuring the temperature of the coils during testing, and additional ground temperature sensors and ambient temperature sensors (not shown) may be included to measure the ground temperature (of the slab, for example) or of the air during testing. Three rotary encoders for measuring the angular position of second charging coil unit 250 are provided. Rotary encoders 394, 395, and 396 are mounted on actuators 252, 253, and 251 respectfully and measure the angular position of the secondary coil unit about the Y-axis, the Z-axis, and the X-axis. If the Y-axis carriage is constructed such that it provides a guideway for a Z-axis to enable movement of the first charging coil in the vertical direction, additional sensors may be installed in the same manner as describe to detect vertical movement on the second charging coil unit.

In one embodiment illustrated in FIG. 3, the electromagnetic field signal means of the sensor sub-assembly is composed of an RFID reader, 487, centrally positioned on the primary coil unit and three RFID tags, 488, positioned in a triangular arrangement on the secondary coil unit. This enables location of the coil units relative to each other and transmission of the location via a circuit to the system controller. In a second, alternative, embodiment not shown in the figures, the electromagnetic field signal means of the sensor sub-assembly is composed of an EMF sensor centrally positioned on the first charging coil unit in alignment with the coil's Y-axis and a single RFID tag centrally positioned on the second charging coil unit in alignment with that coil's Y-axis. This sensor and tag arrangement likewise locates the charging coil units relative to each other, but transmits the strength of the signal to the system controller, such that the maximum field strength found during the positioning cycle is interpreted as the best alignment of the coils. In both instances, the system controller, which is connected via a circuit to a power source and to the translational and rotational drive means of the assembly to align the first and second circular charging coils along their Y-axes to maximize the field strength of the coils. In the sensor and tag arrangement the system uses the strength of the single to hone in on the alignment to attain a maximum signal strength.

Briefly and in both embodiments, to take a magnetic field strength measurement, a magnetic ping is sent and the most sensitive secondary resonant circuit component is measured for voltage or current. Then, coupling coefficient estimation or 'sweet spot' detection is used to determine relative magnetic alignment. The sensor subassembly differs from those of which we are aware in that it employs an electromagnetic field signal system as opposed to a light-activated system as described in U.S. Pat. No. 5,646,500 (Wilson). Moreover, the sensor sub-assembly of the invention requires less sensors than the sensor system described in U.S. Pat. No. 5,467,084 (Alofs).

Dedicated short-range communication (DSRC) will be an important transportation system technology in the coming years. Currently its main use in Europe and Japan is in electronic toll collection, and may be further implemented for electronic parking payments where the cost of charging in a public charge station is billed to the owner of the registered vehicle. It is therefore imperative that a wireless charging system not interfere with the transmitted signals in accordance with communication standards set forth by the Federal Communications Commission (FCC), European Telecommunications Standards Institute (ETSI), and other standards bodies. Referring now to FIG. 3, the preferred placement of a series of sensors is illustrated. At least two dedicated short-range DSRC bi-directional devices, 486, able to communicate using the WSM protocol are mounted on the first and second charging coil units. These short range DSRC devices are able to send and receive packets of data at various transmission frequencies for the purpose of simulating the different established communication protocols and sending the received data back to the controller where a checksum of the sent and received packet data during the charging cycle can be analyzed for test purposes. As an alternative to the use of DSRC, WPT WIFI 2.4 gigahertz may be employed for this purpose.

In addition, a RFID reader or EMF sensor is mounted on first charging coil unit 240. The purpose of this sensor is two-fold: it can be used to take a triangulation measurement or a magnetic field strength measurement as described above. For a triangulation measurement the RFID reader, 487, which can distinguish between a plurality of RFID tags, measures the signal strength from three individual RFID tags, 488, that are mounted on second charging coil unit 250. The reader measures the signal strengths of the RFID tags and transmits them to an A/D converter, which is processed by the CPU of a computer to calculate position by a triangulation method. RFID tags 488 may be either passive RFID or active RFID devices. For a magnetic field strength measurement, instead of an RFID reader a single EMF sensor and a single RFID tag may be employed. In this case, both will be centrally located on the coil units so as to be superposed when the coils are aligned. Optionally, an external temperature monitoring camera or temperature sensors may be mounted on the coil units, such as thermistors or thermocouples for monitoring temperature of the coil units during operation (not shown). The mounting and/or use of the sensors, camera, EMF probe, DSRC devices and the like are well within the level of skill in the art. Like the other sensors, these sensors, probes and DSRC devices would send signals to an A/D and a CPU as already described. The apparatus allows for the relative positioning between coils in a maximum of six degrees of freedom, three in rotation and three in translation.

An alternative embodiment of the apparatus of the invention for use in verification and testing is shown in FIG. 6. In that figure, a servo control system including a servo drive, 170, is mounted at one end of a U-shaped frame, 150. In this embodiment, the X-axis guideways 230 are mounted longitudinally within frame 150, which may be composed of aluminum, steel, polymer concrete or a suitable composite material. The guideways, 230, are disposed within the interior of the frame in perpendicular relation to the vertically extending sides of the frame. Preferably, guideways 230 are an integral part of frame 150. Mounted within U-shaped frame 150 are a drive pulley, 171, mounted to a servo drive, 170, and a passive pulley, 190, mounted by mounting means, 173, in the interior of frame 150 at its other end (also shown in FIG. 5). A drive belt, 172, is positioned on the two pulleys. For the passive pulley, any type of mounting may be used. One skilled in the art is familiar with the functional arrangement and operation of the system as shown and described and can readily choose suitable mounting, belts and servo drives which may be used. X-axis servo drive 170 is coupled to an energy source (not shown) in the manner known in the art.

Figure 5:
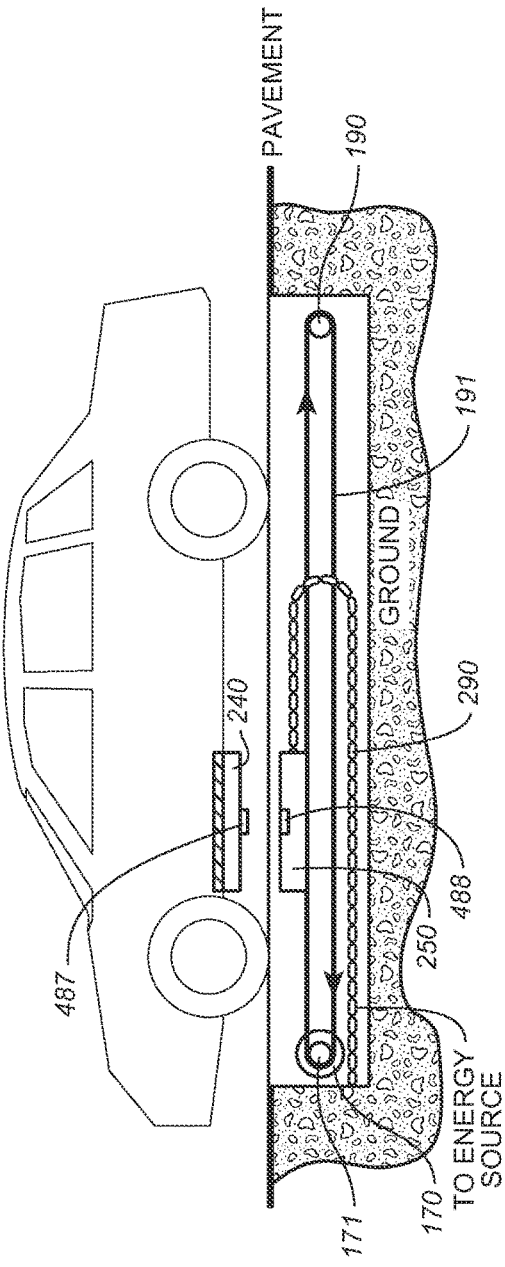
FIG. 5 is a side view of the apparatus of the invention when used as an alignment tool.

A RFID reader or EMF sensor, 487, is centrally mounted on the first charging coil unit as is illustrated in FIG. 5. RFID reader or EMF sensor 487 is communicates with one or three RFID tags 488 as previously described, centrally mounted on first charging coil unit. Referring back now to FIG. 6, the first charging coil unit is disposed on a carriage, 140, having four wheels or roller bearings, 141, that sit on X-axis guideways 230 and enable the carriage to reciprocate from one end of frame 150 to the other. On the underside of coil carriage 140 is a means, 143, to engage the belt of the pulley drive system in a manner known in the art. Frame 150 may be of any length suitable for verifying that the coil units are capable of maximum power production. It should be at least three times as long as the length of the second charging coil unit.

Figure 4:
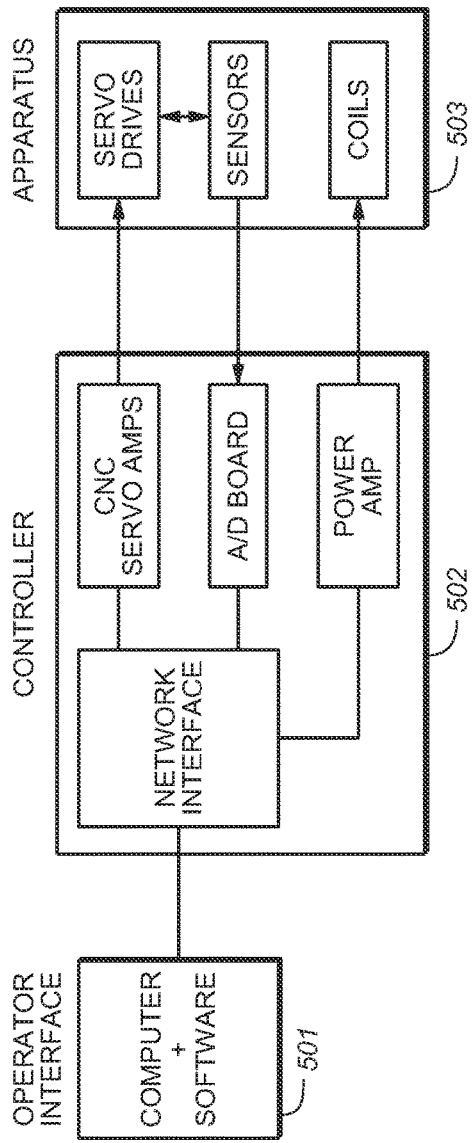
FIG. 4 is a schematic illustration of the key system elements of the testing apparatus of the invention, including a computer and software interface, a controller for interaction of the computer and software with the apparatus.

In FIG. 4, a schematic illustration of the key system components of the verification and optimization apparatus of the invention is provided. Operator interface 501, which is composed of a computer and software, is functionally connected to a system controller, 502, including a network interface, CNC servo amplifiers, an A/D board and a power amplifier. System controller 502 is functionally connected by means of suitable circuitry to the apparatus of the invention, 503, which includes the servo drives, sensors and charging coil units delineated in detail above. A programmed test sequence may be input by the operator via the operator interface using a computer and software provided for that purpose. The computer interfaces with the apparatus, 503, by means of the system controller, 502. The controller includes a network interface card that connects to the computer, servo amplifiers for the actuators and drive system, power amplifiers for supplying the power to the first charging coil unit, and analog to digital (A/D) converters for acquiring sensor readings from the apparatus, 503. (It may be pointed out these structures are components of many standard controllers available in the industry and that one skilled in the art would be able to configure such a controller for the purpose of this invention.) The movement of the first and second charging coil units may be programmed as a series of various test positions in all six degrees of freedom through software by means of a user interface, as depicted in FIG. 4. Movements of the first and second charging coil units relative to each other can be precisely controlled by the actuators and servo drives. Their positions are measured by feedback from the encoders mounted onto the apparatus for each axis of motion (X, Y, and Z). Some of the key criteria requiring measurement at each requested location may include the power transfer between the charging coil units, the electromagnetic field interference at a distance away from the charging coil units, and the temperature of the charging coil units. The different sensors integrated into the apparatus as described above perform these measurements. These sensors may include a movable electromagnetic field strength sensor 381, positioned at some pre-determined distance from the apparatus, various temperature sensors 390, 392, such as thermistors which are mounted on the coil units and in the air to record the ambient temperature while the coils are being tested.

The actuators and servo drives employed to move the various parts of the apparatus may be any of the actuators know in the art that are suitable for this purpose. The choice of suitable actuators and servo drives is within the level of skill in the art and does not require detailing here.

With some simple modifications to the mechanical subassembly, the optimization and verification apparatus of the invention also can be configured as an alignment apparatus for a vehicle charging application. This option is illustrated in FIG. 5 and FIG. 6. Briefly, the second charging coil unit is mounted on the undercarriage of the vehicle rather than positioned on the Y-axis carriage 210 by pivot joint 260. The RFID tags, 488, or single RFID tag (in the case of using the EMF sensor and not the RFID reader), would still be mounted on the second charging coil unit then mounted on the vehicle. The flat panel 270 used to simulate the undercarriage of the vehicle would also no longer be needed since it would be on the vehicle itself. Since the vehicle would facilitate some motion to align the charging coil units in the X, Y and Z axes through the act of parking, some of the other features of the apparatus could be eliminated if adequate charging could still be achieved through a partial alignment of the charging coil units. For example, in its most simplified form all components associated with notion in the Y and Z axes could be eliminated, including those numbered 210, 211, 220, 235, 236 and 237 in FIG. 6. The X-axis guideways would always be essential to the alignment apparatus and would ideally extend the length of a vehicle, since the longitudinal placement (long direction of the vehicle) of the second charging coil unit on the vehicle would vary by vehicle manufacturer and vehicle model.

As illustrated in FIGS. 5, first charging coil unit 240 is mounted on the undercarriage of the vehicle rather than positioned on concrete slab 280 and second charging coil unit 250 is positioned on the assembly as described above in such manner that it will properly align with primary charging coil unit when the coils are vertically aligned one above the other to create an inductive or resonating magnetic field. First charging coil unit 250 is coupled to an electric energy source (not shown) by means of a cable, 290, as is known in the art. The x-axis guideway system for aligning the first charging coil unit with the second charging coil unit mounted on the vehicle undercarriage is illustrated in detail in FIG. 6. It is composed of X-axis servo drive 170, drive pulley 171, passive pulley 190 and belt 172, and guideways 230 disposed within U-shaped frame 150, as has already been described.

All elements composing the apparatus of the invention that are not vehicle mounted (i.e., the guideways, carriage, first charging coil unit, sensors, servo drives etc) can be mounted on the pavement or can be mounted even with or below the pavement. Below the pavement as shown in FIG. 5 is preferred.

In this embodiment, a trough (a rectangular space containing the apparatus below the pavement line), 30, is positioned lengthwise in the parking space with its longitudinal center axis midway between the sidelines of the space. Trough 30 is long enough and wide enough to contain these elements and may be provided with a water impermeable, removable cover (not shown) to protect the parts of the apparatus from environmental elements and vehicles while allowing easy access to the parts for maintenance. The cover is preferably formed of polymer concrete, aluminum, or a composite material, and optionally may be formed with grooves to redirect water away from the guideway.

The second charging coil unit, 250, is coupled to the propulsion batteries of the vehicle in a manner known in the art. See for example, United States Patent No. 4,800,328 (Bolger and Ng). When the apparatus is employed to align a vehicle, RFID sensor 487 is mounted on the first charging coil unit, which in turn is affixed to the undercarriage of the electric vehicle and positioned at or near the vehicle's centerline. RFID tags 488 or a single RFID tag sends a signal that is received by either the RFID reader or EMF sensor mounted on the first charging coil unit. The sensor or reader is mounted such that their Y-axes align with the Y-axes of the charging coil units as has already been described.

In operation, a vehicle provided with a second primary charging coil unit and a RFID tag or tags is parked above the apparatus. The system controller is engaged via the operator interface and the EMF sensor (in the case of a single RFID tag) or RFID reader (in the case of three RFID tags) locate the position of the two charging coil units relative to each other about the X-, Y-, and Z- axes and transmit that location to the system controller, which processes the information. Transmitting directions to the actuators, the system controller then directs the aligning apparatus to move the first charging coil unit in whichever of the x-, y-, and z- directions are necessary to align the two charging coil units above one another to maximize the power transferred between the charging coil units to charge the vehicle's propulsion battery.

Various modifications may be made to the apparatus as described in this detailed description without departing from the spirit of the invention and for that reason, within the scope of the appended claims, the invention may be practiced otherwise than as specifically described. All patents, patent applications, scientific articles, and other documents referenced herein are hereby incorporated by reference for the substance of their disclosure.

We claim:

1. An apparatus for alignment, verification and/or optimization of charging coils in an electric vehicle charging system comprising:
    (a) first and second charging coil units disposed in spaced-apart relation to each other, the first charging coil unit coupled to an electrical energy source and the second charging coil unit coupled to an electric load that is a battery;
    (b) a guideway sub-assembly including a drive mechanism configured to translate the first charging coil unit in X-, Y-, and Z-directions;
    (c) a sensor sub-assembly for sensing the position of the coil units relative to each other, the sensor sub-assembly including electromagnetic field signal means;
    (d) translational drive means actuated by servo drives connected to an electrical power source for moving the first charging coil unit in the X-, Y-, and Z-directions relative to the second charging coil unit;
    (e) rotational drive means actuated by motor means for moving the first charging coil unit in an angular orientation about the X-, Y-, and Z-axes of the second charging coil unit; and
    (f) a system controller connected to an electrical power source and to the translational and the rotational drives means, the system controller being configured to manage, control and direct the movements of the first and the second charging coil units.

2. The apparatus according to claim 1 wherein the guideway sub-assembly includes
    (a) a pair of X-axis linear guideways positioned in parallel, spaced-apart, relation to each other;
    (b) a Y-axis linear guideway positioned above or below the pair of X-axis guideways and in perpendicular relation thereto and formed to rest over or under the X-axis guideways at each of its ends; and
    (c) a carriage slidably mounted on the Y-axis linear guideway and having at least one pivot joint mounted on the end of the carriage's Z-axis permitting three degrees of freedom in rotational movement, wherein the second charging coil unit is mounted on the end of the Z-axis by means of at least one pivot joint to permit motion of the unit in the referenced three degrees of freedom.

3. The apparatus according to claim 2 wherein the carriage is slidably mounted by means of a first set of bearings incorporated into the underside of a carriage and formed to rest on the Y-axis guideway.

4. The apparatus according to claim 3 in which the pair of X-axis guideways are connected to each other and maintained in parallel orientation by means of at least one rigid connection beam extending between the pair of spaced-apart X-axis guideways.

5. The apparatus according to claim 3 in which each end of the Y-axis linear guideway terminates in a reversible, 'C' shaped collar that is formed to permit the resting of the Y-axis linear guideway either on top or below the pair of X-axis linear guideways.

6. The apparatus according to claim 5 in which a second set of bearings are mounted interiorly in the 'C' shaped collar to permit an unimpeded sliding motion of the Y-axis linear guideway along the pair of X-axis guideways.

7. The apparatus according to claim 1 in which the electromagnetic field signal means is composed of an RFID reader centrally positioned on the primary coil unit and three RFID tags positioned in a triangular arrangement on the secondary coil unit that (a) locate the charging coil units relative to each other and transmit the location to the system controller and (b) detect a disruption in field strength and transmit the existence of the disruption to the system controller.

8. The apparatus according to claim 1 in which the electromagnetic field signal means is composed of an EMF sensor centrally positioned on the first charging coil unit and a single RFID tag centrally positioned on the second charging coil unit that (a) aligns the charging coil units relative to each other by sending the field strength signal to the system controller whereby the maximum field strength found during the positioning cycle is interpreted as the best alignment of the coils and (b) detects a disruption or deterioration in field strength and transmits the existence of the disruption or deterioration to the system controller whereby the system power is automatically turned off.

9. The apparatus according to claim 1 in which the system controller is additionally connected to the electric energy source coupled to the charging coil units and is equipped with an emergency shut-off mechanism that terminates the power to the apparatus in case of a disruption or deterioration in field strength.

10. The apparatus according to claim 1 in which the second charging coil unit is positioned on, under, or in a slab simulating a roadway supporting infrastructure.

11. A method for aligning or verifying and optimizing charging coil units in an electric vehicle charging system for an electric vehicle having an undercarriage and using the apparatus according to claim 1 comprising:
    (a) detecting by the radio frequency sensor means of the apparatus according to claim 1 the position of the charging coil units relative to each other; and
    (b) aligning by means of the system controller and the translational and rotational drive means according to claim 1 the first charging coil unit with the second charging coil unit.

12. An improved apparatus for aligning or verifying and optimizing the first and second charging coils disposed within in first and second charging coil units in an electric vehicle charging system, the improvement comprising the use of electromagnetic field signal means for sensing the position of the coil units relative to each other in which the signal means is composed of an RFID reader centrally positioned on the first coil unit and at least three RFID tags positioned in a triangular arrangement on the second coil unit that (a) locate the charging coil units relative to each other and transmit the location to the system controller and (b) detect a disruption in field strength and transmits the existence of the disruption to the system controller.

13. An improved apparatus for aligning or verifying and optimizing first and second charging coils disposed within first and second charging coil units in an electric vehicle charging system, the improvement comprising the use of electromagnetic field signal means for sensing the position of the coil units relative to each other in which the signal means includes an EMF probe centrally positioned on the first coil unit and a single RFID tag centrally positioned on the second coil unit that (a) locates the charging coil units relative to each other by transmitting the strength of the electromagnetic field to the system controller and (b) detects a disruption or deterioration in field strength and transmits the existence of the disruption or deterioration to the system controller.

14. A method for aligning or verifying and optimizing first and second charging coils disposed within first and second charging coil units in an electric vehicle charging system, the method comprising detecting the location of the first charging coil unit relative to the second charging coil unit in the system by electromagnetic field sensor means mounted on the first and second charging coil units and a system controller electrically coupled to the electromagnetic field sensor means.

15. The method according to claim 14 in which the electromagnetic field sensor means comprises an RFID reader centrally positioned on the first coil unit and at least three RFID tags positioned in a triangular arrangement on the second coil unit.

* * * * *